March 15, 1949. J. P. CHITTENDEN 2,464,434
REGULATION OF STEAM AND EXHAUST GAS TURBINES
Filed Jan. 20, 1947 2 Sheets-Sheet 2

Inventor,
John Picton Chittenden
By Babcock & Babcock
Attorneys

Patented Mar. 15, 1949

2,464,434

UNITED STATES PATENT OFFICE 2,464,434

REGULATION OF STEAM AND EXHAUST GAS TURBINES

John Picton Chittenden, Bournemouth, England, assignor to The English Electric Company Limited, London, England, a British company Application January 20, 1947, Serial No. 723,186
In Great Britain October 23, 1942

Section 1, Public Law 690, August 8, 1946
Patent expires October 23, 1962

1 Claim. (Cl. 60—11)

This invention relates to a power plant of the kind incorporating an elastic fluid turbine deriving its motive fluid from one or more internal combustion engine-driven compressors, which latter deliver to the turbine either (i) solely gas from the compressor, or (ii) solely the exhaust gas from the engine cylinder (comprising the products of the combustion in the engine cylinder mixed with the surplus scavenging air supplied to the engine by the said compressor, or by a separate air compressor driven by the same internal combustion engine) or (iii) a mixture of the engine exhaust with air coming direct from the compressor. The second of these alternatives is more usual but engine-driven compressors of the above general types will be hereinafter referred to simply as gas generators.

With the object of improving the overall thermal efficiency of such a plant, the present invention adds a boiler which is heated wholly or in part by residual heat in the exhaust gases from the internal combustion engine, which heat would otherwise be wasted; this boiler generates steam which is used for augmenting the mechanical power output of the plant by being passed through steam turbine blades. Thus with arrangement (i) mentioned above the combustion gases go directly through the heater of the boiler to exhaust while with arrangements (ii) and (iii) they go first through the turbine.

The invention is illustrated in the accompanying drawing as applied to a plant of the kind wherein the gas generator is of the known free piston type wherein a reciprocating engine piston is combined with or connected to and reciprocates with a compressor piston, thereby driving the latter without the aid of cranks, crankshafts or connecting rods. The engine part of the gas generator may work on a two-stroke compression ignition cycle and is shown as including two opposed pistons.

Figure 1:
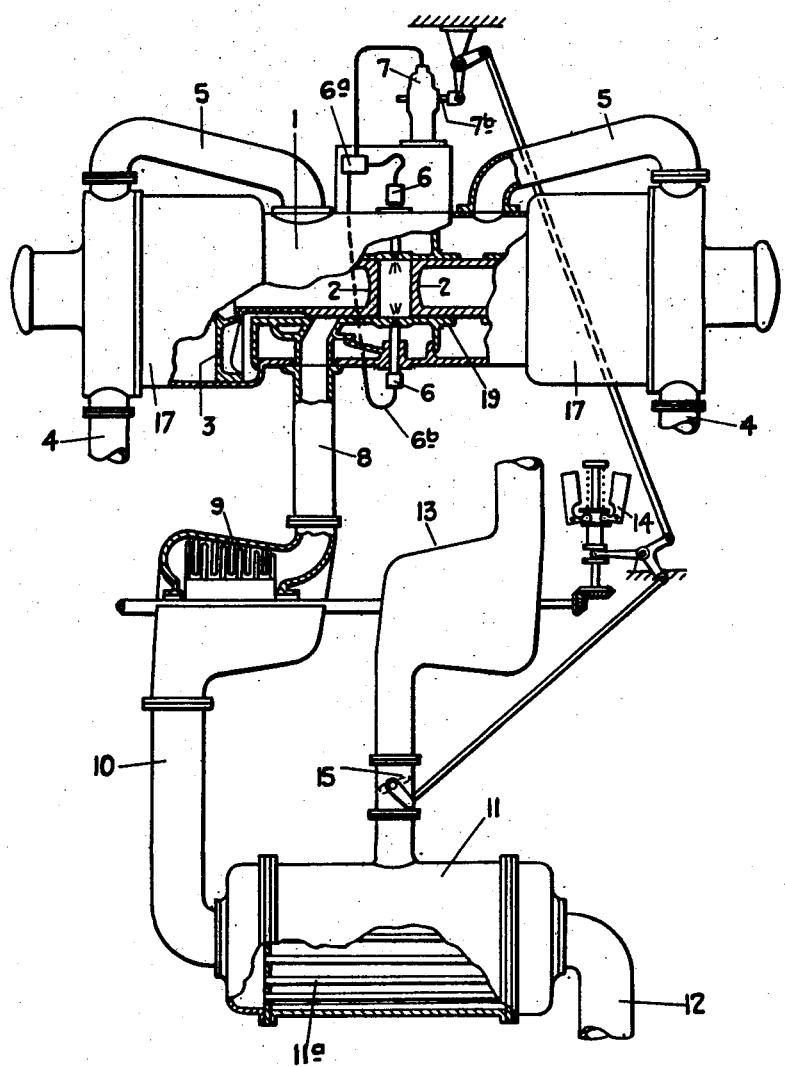
Fig. 1 shows diagrammatically a free piston type gas generator, partly in section, delivering a mixture of exhaust gas and compressed air to a gas turbine, which exhausts through a boiler in which steam is raised for a steam turbine arranged in driving association with the gas turbine.

Referring first to Fig. 1, the gas generator is indicated at 1, each of the opposed free piston units including an engine piston 2 and a compressor piston 3. Air drawn into the compressor cylinders 17 through inlet ducts 4 is compressed and discharged through the scavenging ducts 5 into the engine cylinder 19 wherein it is compressed and then receives an injected charge of fuel from the fuel injectors 6 supplied by the usual fuel pump 7 through a usual type of distributor 6a and fuel pipes 6b. The exhaust gases from the engine comprising the products of combustion mixed with the surplus scavenging air from the compressor cylinders 17 go by way of exhaust conduit 8 through the turbine 9 and then by way of a further exhaust conduit 10 through the heater tubes 11a of the boiler 11 and are finally exhausted at 12. The steam generated in boiler 11 passes through the turbine 13 in driving association with the gas turbine 9 and from there to exhaust or to a condenser (not shown).

Figure 2:
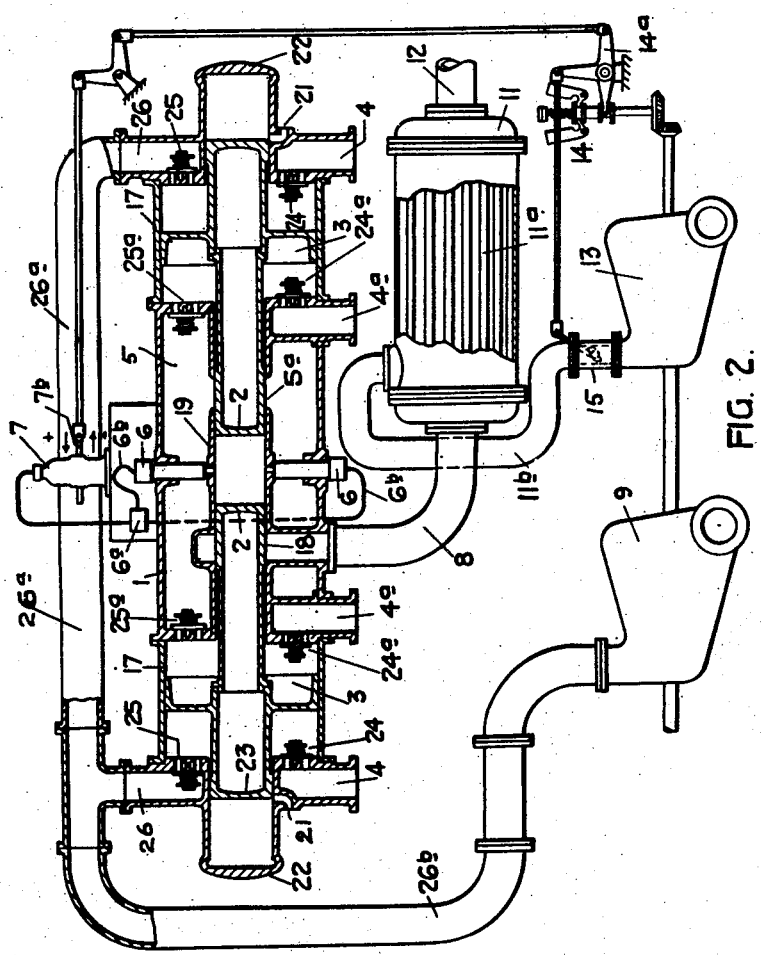
Fig. 2 shows a double acting free piston type compressor delivering compressed air to a gas turbine and discharging exhaust gases plus scavenging air through a boiler in which steam is raised for a steam turbine arranged in driving association with the gas turbine.

Referring now to Fig. 2, the free piston type compressor 1 comprises a common combustion cylinder 19, two double acting compressor cylinders 17 and two cushion cylinders 22. Two free piston units, each consisting of an engine piston 2, a compressor piston 3 and a cushion piston 23 reciprocate symmetrically to one another in the said cylinders.

Air is admitted to both sides of the two compressor cylinders through inlet manifolds 4, 4a respectively and at least one inlet valve 24, 24a respectively, on each side. Compressed air is discharged from the cylinders 17 through at least one outlet valve 25, 25a, respectively, on each side.

The air is discharged through valves 25 into the manifolds 26 which are connected by the pipe 26a amongst themselves, and by pipe 26b to the gas turbine 9. The air discharged through the valves 25a is passed through the cylindrical scavenging duct 5 and the scavenging ports 5a into the engine cylinder 19 near the end of the outward stroke of the piston assemblies; the mixture of exhaust gases and scavenging air is passed through the exhaust ports 18, exhaust conduit 8 and the heater tubes 11a of the boiler 11 and finally exhausted at 12.

Steam raised in the boiler 11 is passed through the conduit 11b to the steam turbine 13 and from there to exhaust or to a condenser (not shown). The speed governor 14 controls through the three-armed lever 14a the throttle 15 for the steam turbine 13 and the fuel rack 7b of the fuel injection pump 7.

The free piston engines are shown to be of a symmetrical type having one common combustion cylinder and a pair of compressor cylinders and a pair of cushion cylinders.

What I claim as my invention and desire to secure by Letters Patent is:

A heat engine power plant comprising in combination a gas turbine, a steam turbine, an internal combustion engine-compressor unit, and a boiler, the said internal combustion engine-compressor unit being adapted to supply gaseous fluid under comparatively high pressure to the said gas turbine, the said boiler being adapted to be supplied with exhaust gases from the said internal combustion engine at elevated temperature and comparatively low pressure and to supply steam under pressure to the said steam turbine, and the said steam turbine being in driving association with the said gas turbine, a common speed governor for the said gas turbine and the said steam turbine, a throttle valve in the supply connection between the said boiler and the said steam turbine, a fuel control means in supply connection with the said internal combustion engine, the said throttle valve and the said fuel control means being adapted to be simultaneously controlled by the said speed governor.

JOHN PICTON CHITTENDEN.

REFERENCES CITED

The following references are of record in the file of this patent:

UNITED STATES PATENTS

| Number | Name | Date |
|---|---|---|
| 2,252,528 | Sikorsky et al. | Aug. 12, 1941 |
| 2,370,949 | Gaisberger | Mar. 6, 1945 |

FOREIGN PATENTS

| Number | Country | Date |
|---|---|---|
| 110,559 | Switzerland | June 1, 1925 |
| 183,759 | Switzerland | July 16, 1936 |